United States Patent [19]
Kinoshita

[11] Patent Number: 5,180,595
[45] Date of Patent: Jan. 19, 1993

[54] METAL MOLD FOR RESIN SUBSTRATE FOR AN OPTICAL RECORDING MEDIUM

[75] Inventor: Shinitsu Kinoshita, Toride, Japan

[73] Assignee: Hitachi Maxell, Ltd., Osaka, Japan

[21] Appl. No.: 892,479

[22] Filed: Jun. 2, 1992

Related U.S. Application Data

[63] Continuation of Ser. No. 502,125, Mar. 30, 1990, abandoned.

[30] Foreign Application Priority Data

Mar. 31, 1989 [JP] Japan .................................. 1-078482
Mar. 5, 1990 [JP] Japan .................................. 2-051880

[51] Int. Cl.⁵ ...................... B29D 17/00; B29C 45/00
[52] U.S. Cl. .................................... 425/556; 264/106; 425/810
[58] Field of Search ................ 264/106, 107; 425/556, 425/810, 812

[56] References Cited

U.S. PATENT DOCUMENTS

| | | | |
|---|---|---|---|
| 4,374,636 | 2/1983 | Holmes | 425/810 |
| 4,741,689 | 5/1988 | Onizawa et al. | 425/812 |
| 4,772,196 | 9/1988 | Asai | 425/810 |
| 4,917,833 | 4/1990 | Cools | 425/810 |
| 5,006,058 | 4/1991 | Maruyama et al. | 425/556 |
| 5,092,758 | 3/1992 | Tanaka et al. | 425/810 |
| 5,106,553 | 4/1992 | Onisawa et al. | 425/810 |

FOREIGN PATENT DOCUMENTS 0211330 7/1986 European Pat. Off. .
0255088 8/1987 European Pat. Off. .

OTHER PUBLICATIONS

Patent Abstracts of Japan, vol. 9, No. 327 (P-415)(2050) Dec. 21, 1985, and JP-A-60-151852 (Matsushita Denki Sangyo K.K.) Aug. 9, 1985, abstract only.

Primary Examiner—Jay H. Woo
Assistant Examiner—Scott Bushey
Attorney, Agent, or Firm—Birch, Stewart, Kolasch & Birch

[57] ABSTRACT

A metal mold for manufacturing a resin substrate useful as a optical recording medium.

7 Claims, 9 Drawing Sheets

1 ··· MOVABLE METAL MOLD
5 ··· FIXED METAL MOLD
6 ··· CAVITY
24 ··· PROJECTED PIN
30 ··· FIXED CUTTER
31 ··· SPOOL
33 ··· MOVABLE CUTTER

PRIOR ART

FIG. 11

PRIOR ART

FIG. 12

PRIOR ART

FIG. 13

PRIOR ART

FIG. 14

PRIOR ART

FIG. 15

PRIOR ART

METAL MOLD FOR RESIN SUBSTRATE FOR AN OPTICAL RECORDING MEDIUM

This application is a continuation of application Ser. No. 502,125, filed on Mar. 30, 1990, now abandoned.

BACKGROUND OF THE INVENTION

1. Field of the Invention

The present invention relates to a resin substrate for an optical recording medium and more specifically to a metal mold for making the same by injection molding.

2. Discussion of Related Art

Conventionally, optical recording mediums such as compact discs wherein the substrate is made of an injection-molded resin have been known.

Figure 10:
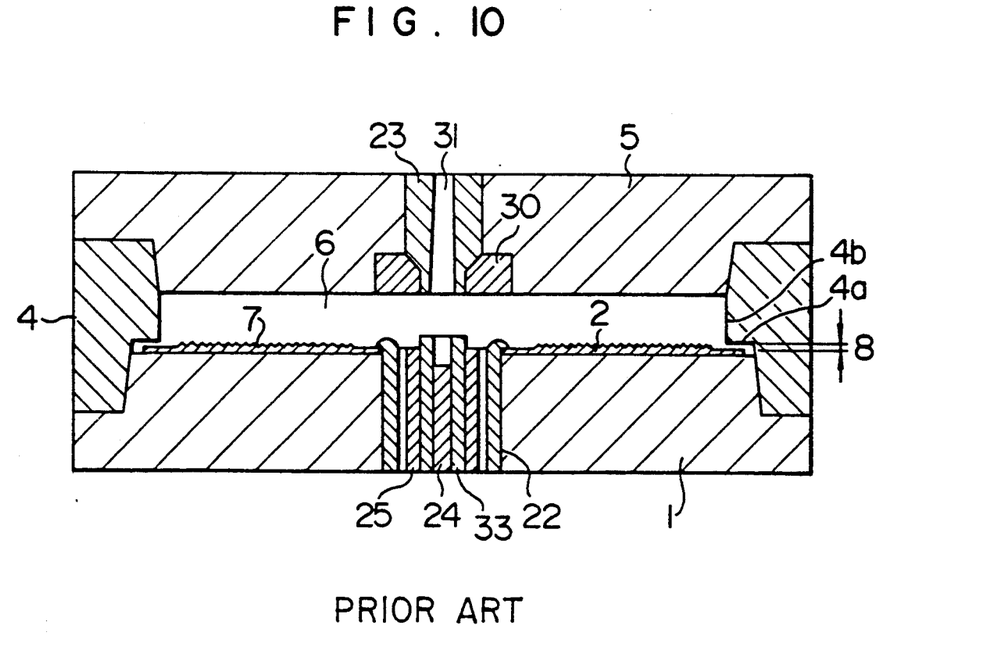
FIG. 10 is a cross sectional view of a conventionally known metal mold.

FIG. 10 is a cross sectional view showing an example of metal molds used for injection molding a resin substrate, providing a stamper 2 reinforced by a backing plate 1, a ring-shaped stamper inner circumference presser 22, a ring-shaped stamper outer circumference presser 4, and a mirror plate 5 detachably engaged with the open end of the stamper outer circumference presser 4, to form a disc-shaped cavity 6, which together with the backing plate which serves as a metal mold for supporting the stamper 2.

The above stamper 2 is a thin plate-shaped metal mold on which a reverse pattern 7 of a spiral or concentric signal pattern to be transferred onto a resin substrate is formed and mounted on the backing plate 1 by the stamper inner circumference presser 22 and the stamper outer circumference presser 4.

The stamper inner circumference presser 22 firmly fixes the inner circumference of the stamper 2 to the backing plate 1, whereas the stamper outer circumference presser 4 is arranged so as to provide a clearance 8 of about 15 μm maximum between a stamper abutting surface 4a of the outer presser 4 and the surface of the stamper 2 so that the stamper 2 can be thermally expanded in radial directions freely and a signal pattern having highly true roundness can be transferred by exhausting a gas from the cavity 6 when it is filled with resin, and thus the stamper outer circumference presser 4 loosely supports the outer circumference of the stamper 2.

The cavity-side surface of the stamper outer circumference presser 4, i.e., the surface 4b which forms the outer circumferential surface of the resin substrate, is substantially vertically formed with respect to the surface of the stamper 2 on which the reverse pattern is formed to make the outside appearance of the formed substrate look good.

Figure 11:
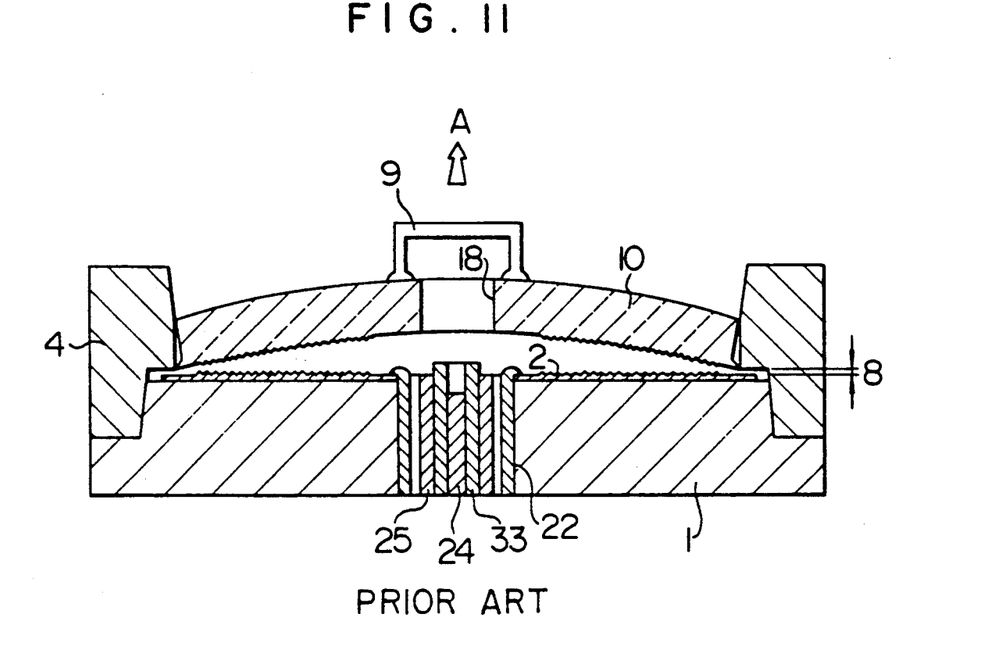
FIG. 11 is a cross sectional view showing a way by which a resin substrate is removed.

Further, as shown in FIG. 11, the metal mold is provided with a robot 9 for removing the substrate so that the injection-molded resin substrate 10 can be automatically removed from the cavity 6. The substrate removing robot 9 is inserted between the stamper outer circumference presser 4, after injection molding has been completed and the mirror plate 5, the surface of which in contact with the resin being molded is polished like a mirror, is removed. The robot 9 attaches itself substantially to the center of the resin substrate 10 and pulls it out of the open end side of the stamper mad (in the direction of arrow A).

The known technique regarding the above is disclosed in Japanese Patent Kokoku (Post Exam. Publication) No. Sho 60-18527.

Figure 12:
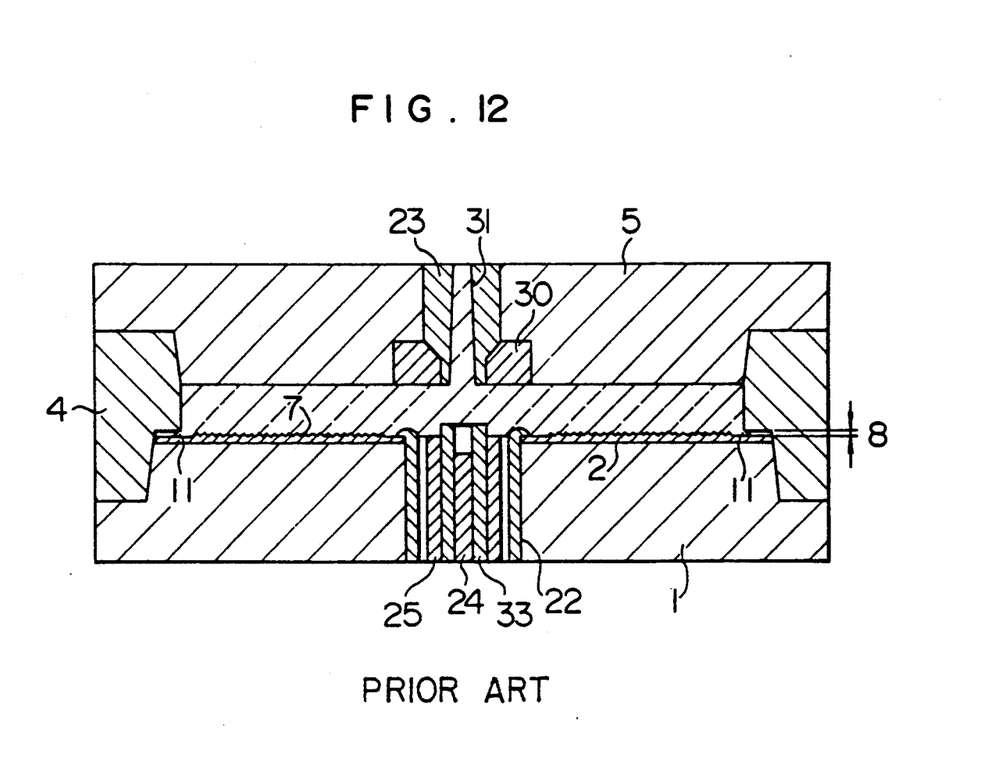
FIG. 12 is a cross sectional view showing portions where burrs are made.

As described above, the metal mold used for the molding of a resin substrate for an optical recording medium is provided with the clearance 8 between the stamper 2 and the stamper outer circumference presser 4, which is different from a usual metal mold, and thus when resin is injected into the cavity 6, melted resin enters the above clearance 8 by pressure produced during the injection and burrs 11 are formed around the circumference of the resin substrate 10, as shown in FIG. 12. The burrs 11 are not uniformly made around the circumference of the resin substrate 10, but partially made or not made at all depending upon the dimension of the above clearance 8.

Therefore, a problem arises in that the resin substance 10 has an inferior outside appearance and thus the commercial value is lowered as well as various functional problems arise in that the resin substrate 10 is liable to come into collision with a device such as, for example, a disc cartridge or an optical recording medium drive unit which moves relative to the optical recording medium, because an external dimension of the resin substrate 10 is made larger than a designed value.

Further, although the effect of the burrs 11 can be avoided in such a manner that when the injection-molded resin substrate 10 is removed from the cavity 6, the combined member of the backing plate 1 and the stamper 2 is separated from the stamper outer circumference presser 4 and the resin substrate 10 is removed from the stamper 2, a disadvantage arises in this case in that the stamper 2 is deformed by a removing force of the resin substrate 10, because the outer circumference of the stamper 2 is provided as a free end. Consequently, as shown in FIGS. 11 and 13, to remove the resin substrate 10, the mirror plate 5 must be separated from the stamper outer circumference presser 4, and the resin substrate 10 is drawn out upwardly along the stamper outer circumference presser 4.

Figure 13:
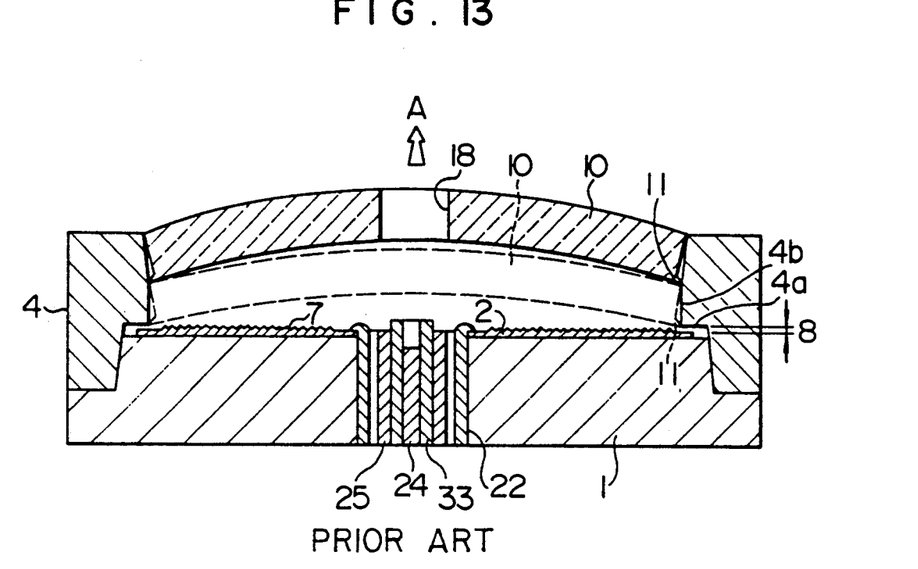
FIG. 13 is a cross sectional view showing a problem of a conventional metal mold.

To enable the resin substrate 10 to be removed from the cavity 6 by this method, the resin substrate 10 must be curved to an angle at which the extreme ends of the burrs 11 pass over the corner defined by the stamper abutting surface 4a of the stamper outer circumference presser 4 and the cavity side surface 4b, as shown in FIG. 13. Moreover, in the conventional metal mold mentioned above, since the cavity side surface 4b of the stamper outer circumference presser 4 is formed substantially vertically with respect to the reverse pattern forming surface of the stamper 2, a bending stress is continuously applied to the resin substrate 10 while the extreme ends of the burrs 11 are held in abutment against the cavity side surface 4b of the stamper outer circumference presser 4. Various obstacles arise when the resin substrate 10 is removed from the stamper outer circumference presser 4 while such a bending stress is applied to the resin substrate 10. That is, a problem arises in that the flat shape of the resin substrate 10 is liable to be distorted and the resin substrate 10 is susceptible when being made into an optical anisotropic member. In particular, since the resin substrate 10 not be removed from the metal mold before it has been sufficiently cooled to increase productivity, such a problem is often the result.

Figures 14, 15:
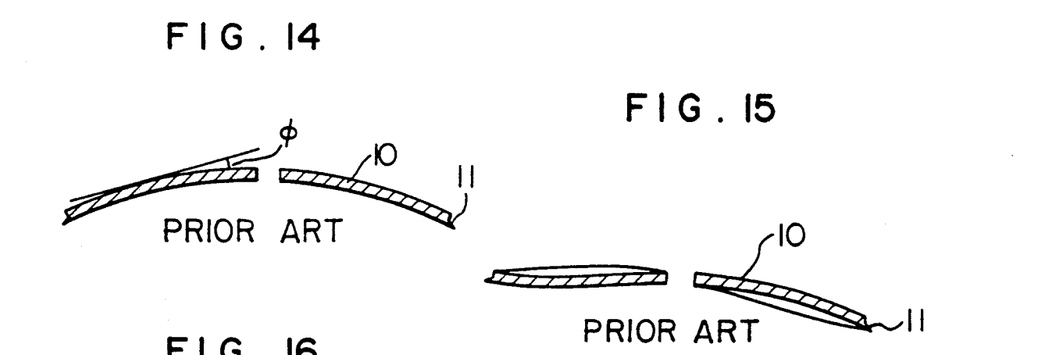
FIG. 14 is a cross sectional view of a portion where a residual deformed curvature is made of a molded resin substrate removed from the conventional metal mold.
FIG. 15 is a cross sectional view of a possible modification of the curvature shown in FIG. 14.

When the resin substrate 10 is removed from the metal mold at a temperature as high as possible but below the thermal deformation temperature thereof (accordingly, at a temperature near to the thermal deformation temperature), the characteristics of the resin substrate with respect to optical anisotropy, such as the retardation (birefringence) of the resin substrate, can be kept in a good state, however the drawback arises in that the resin substrate is deformed when it is removed from the metal mold and it remains deformed, as shown in FIGS. 11 and 13. This residual deformation includes such types as:

(i) a residual curvature as shown in FIGS. 14 and 15, which is often observed in a resin substrate in which the burrs shown in FIG. 13 are uniformly formed around the entire circumference thereof having substantially the same length; and (ii) an upward and downward waving curvature, which is formed on the surface of the resin substrate, when the above burrs 11 having varying lengths are formed around the entire circumference of the resin substrate.

In particular, as the cycle of the waves is made shorter in the second circumstance, a problem arises in that the sensitivity of the optical disc for recording and reproducing information is greatly lowered and the recording and reproducing error ratio is increased when the optical disc is used. The degree of adverse effects applied to the optical disc product by the residual deformation of the resin substrate depends upon an angle $\phi$ representing a magnitude of the deformation shown in FIG. 14, and, in general, the sensitivity for recording and reproducing information deteriorates and the information recording and reproducing error ratio is increased in the range of $\phi > 5m$ radian.

Therefore, the temperature at which the injection-molded resin substrate is removed from the metal mold is needed to be a temperature at which the above deformation does not remain. This temperature is different depending upon the kind of a resin material, and the time necessary from supply of resin to the cavity of an injection molding machine to removing the melted resin is also different depending upon the kind of resin, and thus a problem arises in that the manufacturing job is complex and the manufacturing cost is increased.

SUMMARY OF THE INVENTION

Therefore, it is an object of the present invention to provide an optical recording medium having an excellent outside appearance and a highly accurate external dimension. A second object of the present invention is to provide a metal mold capable of injection-molding a resin substrate used for a optical recording medium.

To achieve the above objects, the present invention uses a transparent resin substrate in which an external dimension of the signal pattern surface of the substrate is made smaller than an external dimension of a light incident surface of the substrate and the extreme ends of burrs projecting from the outer circumferential edge of the above signal pattern surface is formed inwardly of the outer circumferential edge of the light incident surface.

To achieve the above, a dimension of a metal mold projection ring formed on the stamper outer circumference side corner of the metal mold is made smaller than a dimension of a corner extreme end of the metal mold in contact with the stamper outer circumference presser of a cavity mold defined by a mirror plate and the stamper outer circumference presser by at least an amount corresponding to a projecting amount of the burrs made between both the members.

A molding machine employing a metal mold which can reliably make burrs at the outer circumferential edge of a signal pattern side of a transparent resin substrate must be used.

More specifically, according to an arrangement of the metal mold embodying the present invention, shown in FIGS. 3 to 7, a clearance 8 having an optimum value is provided at the portion of a stamper presser 4 and a stamper 2, the value of the clearance 8 being adjusted and set, because it changes depending upon the kind of resin material used, the melting temperature of the resin material to be injected and supplied, the dimension and set value of burrs, temperature of the stamper presser 4, and the like.

For example, when injection molding is carried out in such a manner that a polycarbonate resin is melted at a temperature from 280° and 360° C., injected into the stamper presser of 70° to 130° C., and a length of burrs formed is set to 20 to 30 $\mu$m or less, a value of the above clearance must be set to about 10 $\mu$m ±4 $\mu$m.

The polycarbonate transparent substrate made by the above injection molding method is removed from the metal mold at a substrate temperature preferably from 115° to 128° C. and more preferably from 120° to 128° C., taking into consideration that no residual deformation remains and optical anisotropy, such as retardation, is made as small as possible.

In many cases, the optical recording medium is observed from the plane direction thereof in view of the configuration and function thereof. Further, two optical recording mediums are often bonded together with the signal pattern surfaces thereof faced inwardly. Therefore, when the extreme ends of the burrs projecting from the outer circumferential edge of the signal pattern surface of the substrate is disposed inwardly of the outer circumferential edge of the light incident surface, the burrs are barely observed from the plane direction of the optical recording medium, whereby the outside appearance thereof is improved.

Further, since the burrs do not project to the outside of the light incident surface, an accuracy of an external dimension of the optical recording medium is greatly improved.

Further, when the configuration of the cavity side surface of the stamper outer circumference presser is formed such that the inside width of the presser on the stamper side is made smaller than the inside width of the presser on the mirror plate side, the curvature of the injection molded transparent substrate can be reduced. Thus when the formed resin substrate is removed, it must be curved similar to a conventional substrate until the burrs pass over the corner defined by the abutting surface of the stamper outer circumference presser and the cavity side surface, but thereafter the inside width of the cavity side surface is wider than the above corner. Thus, the bending stress applied to the resin substrate is lowered, whereby deformation and retardation of the substrate is reduced.

As described below in detail, according to the present invention, an injection-molded substrate can be removed from a metal mold with almost no bending stress applied thereto, and thus a resin substrate for an optical recording medium, excellent in optical characteristics, can be formed. In addition, since burrs are formed such that they do not project outwardly from the light incident surface, the outside appearance of an optical recording medium can be improved.

BRIEF DESCRIPTION OF THE DRAWINGS

FIGS. 3 to 7 are diagrams of examples according to the present invention, wherein

FIGS. 10 to 13 are diagrams explaining prior art, wherein

DETAILED DESCRIPTION OF PREFERRED EMBODIMENT

Figure 1:
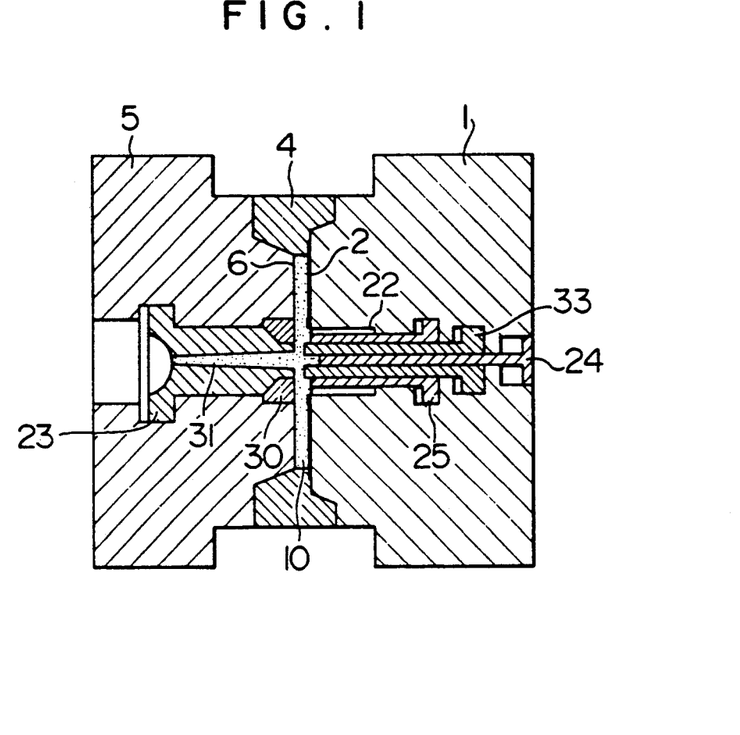
FIG. 1 is a cross sectional view of a metal mold for a transparent substrate according to the examples of the present invention.
Figure 2:
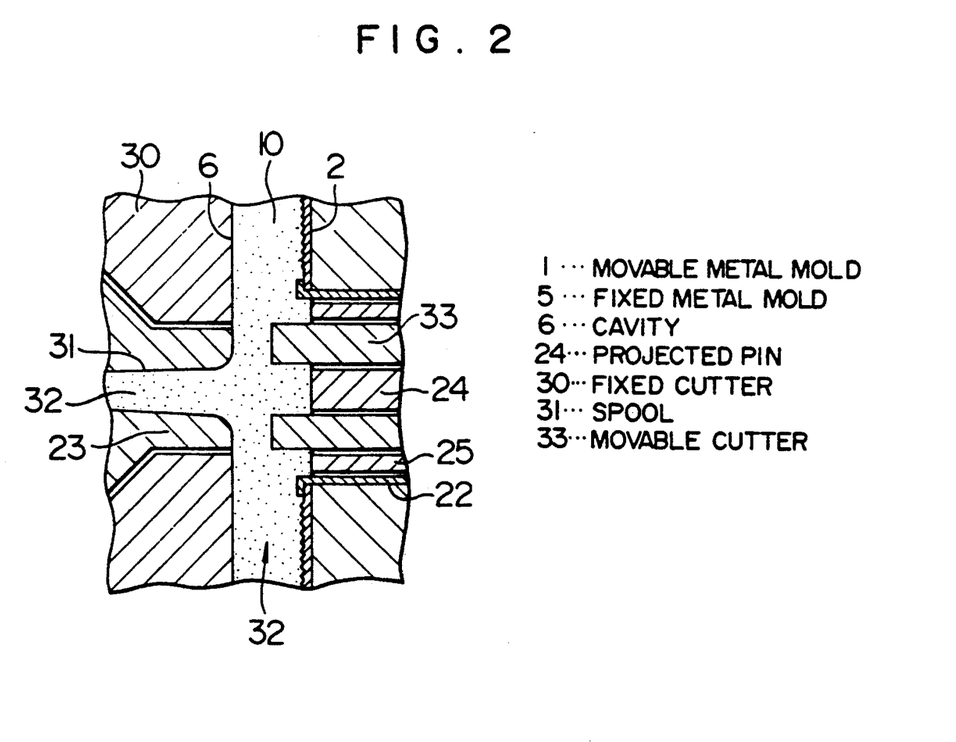
FIG. 2 is an enlarged cross sectional view of a stamper inner circumference pressing ring used for the metal mold of FIG. 1 and the position of a movable cutter for cutting injection-molded resin.

FIGS. 1 and 2 are cross sectional views showing a resin substrate for an optical disc molding apparatus as a whole according to the present invention. An example of the metal mold comprises a fixed metal mold 5 and a movable metal mold 1, and a disc-shaped cavity 6 is formed between the joined faces of the fixed metal mold and the movable metal mold. The cavity side surface of the above fixed metal mold 5 is mirror-finished so that it can form the mirror surface (light incident surface) of an optical disc substrate. On the other hand, a stamper 2, on which a reverse pattern of a signal pattern to be transferred onto the optical disc substrate is formed, is mounted on the inner surface of the movable metal mold 1, so that the signal surface of the optical disc substrate can be formed. The fixed metal mold 5 has a spool 31 defined therethrough communicating with the center of the above cavity 6, and a ring-shaped fixed cutter 30 is disposed around the outer circumference thereof. On the other hand, a cylindrical movable cutter 33 having an outside diameter capable of being inserted into the fixed cutter 30 is disposed at the portion confronting the above fixed cutter 30 of the movable metal mold 1 such that the movable cutter 33 goes in and out of the fixed cutter 30.

Figure 6:
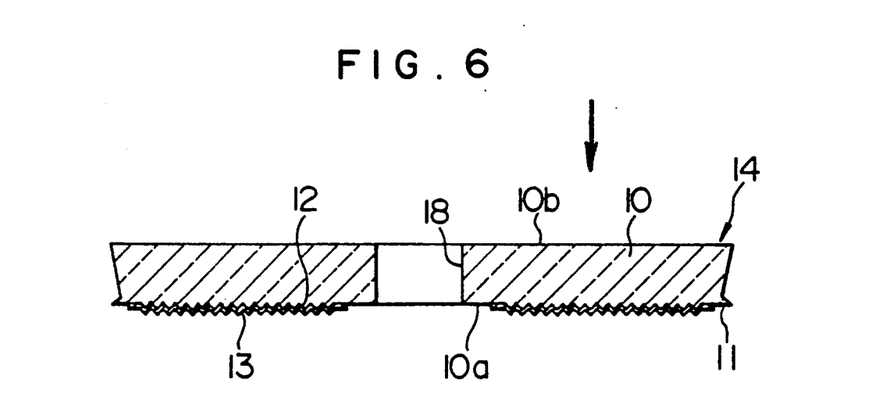
FIG. 6 is a cross sectional view of an optical recording medium using a substrate made by the metal mold of the first example.

As shown in FIG. 1, the metal mold for molding the optical disc substrate functions in such a manner that melted resin 32 fills the cavity 6 through the spool 31 to form the substrate 10 of plate shape having a mirror surface and a signal surface, then, as shown in FIG. 2, the movable cutter 33 is moved forwardly to enable the extreme end thereof to be inserted into the fixed cutter 30 thereby to cut the portion of the resin molded in the spool 31 and define a center hole 18 (FIG. 6).

As shown in FIG. 6, this metal mold for molding optical an disc substrate enables the center hole 18 to be mirror-finished. In FIG. 1, a cavity pressure ring 4 regulates the outer circumferential configuration of the cavity 6, a stamper inner circumference presser 22 (stamper holder) fixes the stamper 2 to the movable metal mold, spool 31 is defined by spool bush 23, projected pin 24 bends off a thin wall portion, and eject ring 25 removes the optical disc substrate from the movable metal mold The metal mold for molding the optical disc substrate in the figures is characterized in that the range in which the movable cutter 33 can be moved is restricted. More specifically, the moving range of the movable cutter 33 is adjusted such that when it is moved to the most advanced position thereof from the most retracted position thereof (refer to FIG. 4), the extreme end of the movable cutter 33 is not inserted into the fixed cutter 30.

Preferred Embodiments

Example 1

Figure 3:
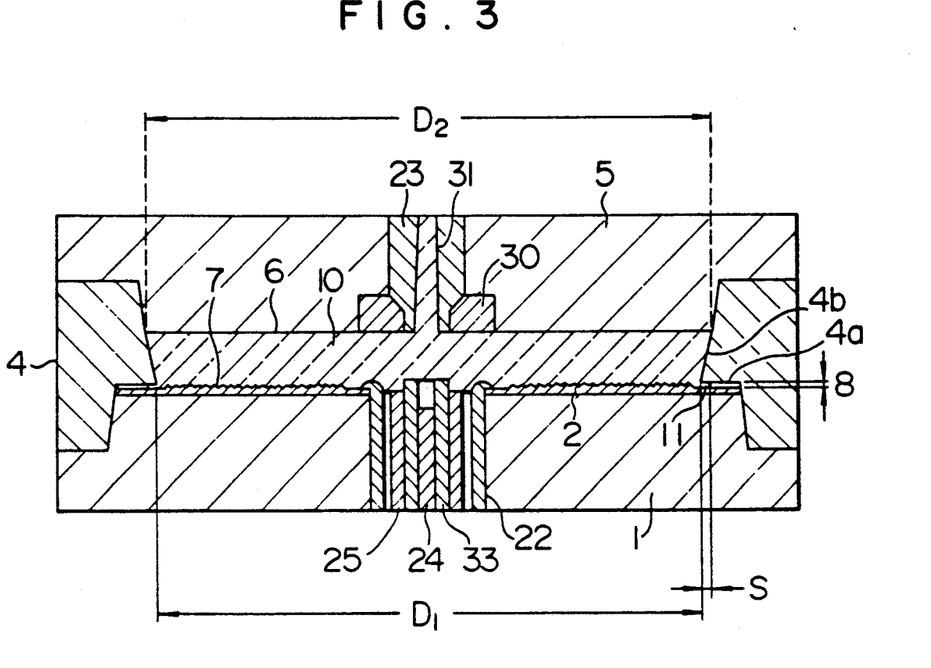
FIG. 3 is a cross sectional view of a metal mold according to the first example.

FIG. 3 shows the first example of the metal mold according to the present invention. As shown in FIG. 3, the metal mold comprises a stamper 2 reinforced by a backing plate 1, a stamper inner circumference presser 22, a stamper outer circumference presser 4, a mirror plate 5, and a cavity 6.

The present invention is characterized in that the cavity side surface 4b of the above stamper outer circumference presser 4 is formed at an inclined shape such that it is narrower on the stamper 2 side and made gradually wider toward the above mirror plate 5 and that a dimension $D_1$ of the portion defined by the stamper 2 of the cavity 6 and the stamper outer circumference presser 4 is smaller than a dimension $D_2$ of the portion defined by the mirror plate 5 and the stamper outer circumference presser 4.

A dimensional difference ($D_2-D_1$) between the dimension $D_2$ of the mirror plate 5 side and the dimension $D_1$ of the stamper 2 side is set to a value at least larger than a projecting amount S of burrs 11 formed between the stamper 2 and the stamper outer circumference presser 4, as discussed above.

Figure 16:
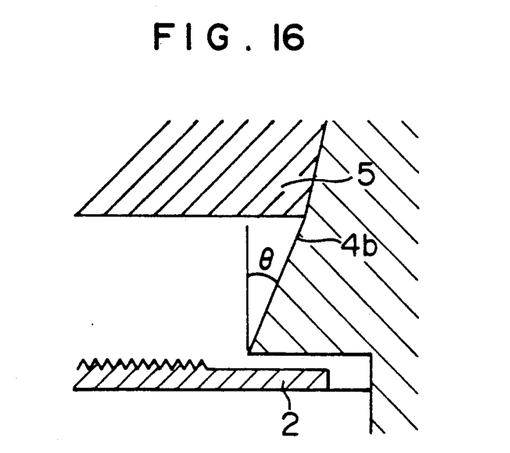
FIG. 16 is a cross sectional view of a metal mold showing in an inclining direction the angle of the mirror-finished side wall of a stamper outer presser, which serves as a stamper support, for an injection molding metal mold.

As shown in FIG. 16, the surface 4b of the stamper outer circumference presser 4 preferably has an inclining angle $\theta$ of 2° to 30° and more preferably has an inclining angle 3° of 10°.

Figure 17:
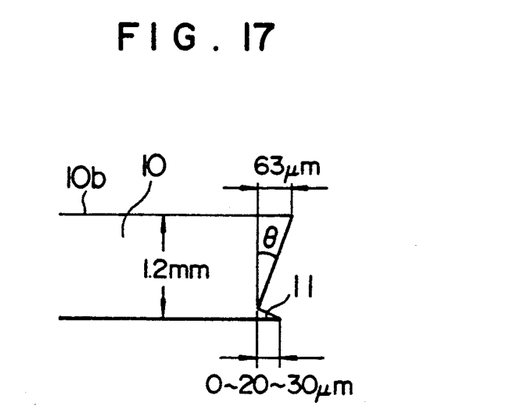
FIG. 17 is a cross sectional view of the side wall at the outer circumferential edge of a transparent resin substrate molded by the injection molding metal mold shown in FIG. 16, a configuration of burrs, and the angle of the side wall.

Further, the transparent resin substrate molded by an injection molding machine according to the present invention has an optimum dimension shown in FIG. 17, in which a value of angle $\theta$ is the same as a value of angle $\theta$ shown in FIG. 16.

Figure 4:
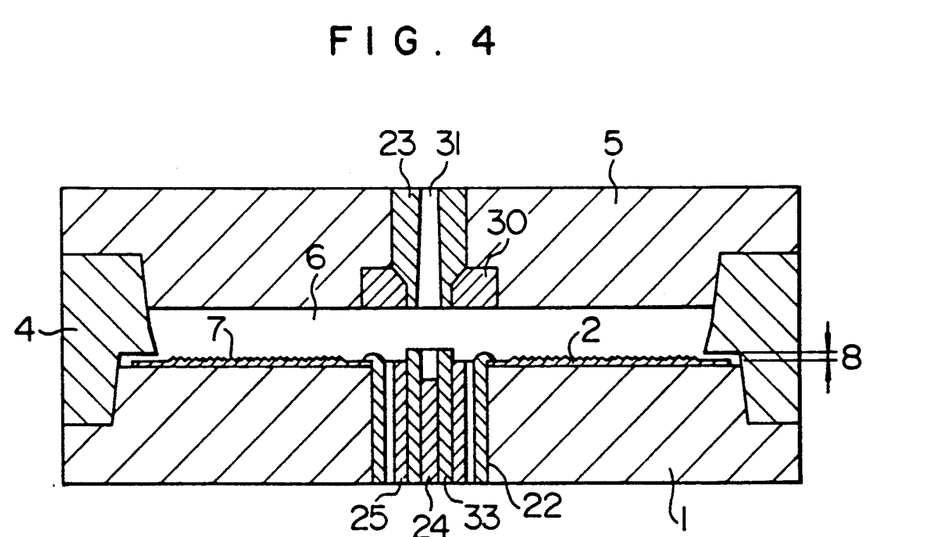
FIG. 4 is a cross sectional view showing a modified example of the metal mold according to the first example.

Note that the concept of an inclined shape in the present invention includes a curve surface as shown in FIG. 4 in addition to a completely inclined surface shown in FIG. 3.

The present example is arranged similar to the above conventional metal mold except the configuration of the cavity side surface of the stamper outer circumference presser 4.

When the metal mold for a resin substrate for an optical recording medium according to the example is used, burrs similar to those made in the metal mold according to the prior art are also formed in a clearance 8 defined between the stamper 2 and the stamper outer circumference presser 4. Therefore, when a molded resin substrate 10 is removed by a robot 9, the resin substrate 10 must be curved to the same degree as that conventionally experienced, as shown by a dotted line in FIG. 5, until the burrs 11 clear the corner defined by the stamper abutting surface 4a of the stamper outer circumference presser 4 and the cavity side surface 4b.

Figure 5:
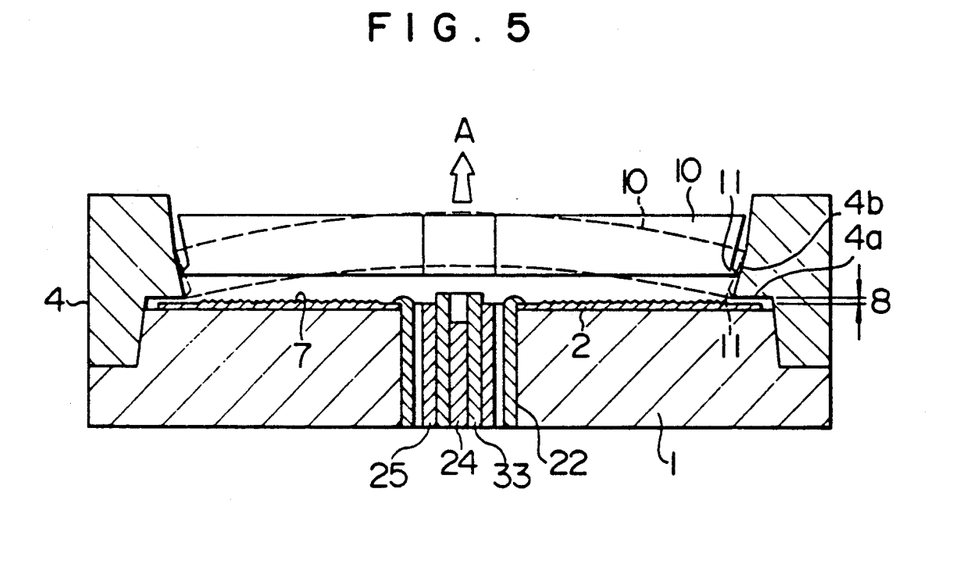
FIG. 5 is a cross sectional view explaining the advantages of the metal mold according to the first example.

Since, however, the inner width of the cavity side surface 4b is gradually increased after the burrs 11 have cleared the above corner, the curvature of the resin substrate 10 is reduced or substantially eliminated as shown by a solid line in FIG. 5, whereby a bending stress applied to the resin substrate 10 can be lowered. As a result, deformation and retardation of the resin substrate 10 is reduced, whereby a resin substrate excellent in optical characteristics can be made.

The following table shows the flatness of the light incident surface of the resin substrate molded by the conventional metal mold and that of the resin substrate molded by the metal mold according to the above first example. In the test of flatness, three specimens having different resin injecting conditions and conditions for removing the specimens from the metal molds were prepared and an inclination of the light incident surface of each specimen was measured. Numerals in the table show a dispersion of inclinations at a plurality of preset points on each specimen by a unit of milliradian, wherein "0" shows that the light incident surface is not inclined at all and symbols + and − show a direction of the inclination.

| Specimen | Conventional Metal Mold | Metal Mold of the Invention |
| --- | --- | --- |
| (1) | $-1 \sim +5$ | $+2 \sim +4$ |
| (2) | $-8 \sim +9.5$ | $0 \sim +2$ |
| (3) | $-3 \sim +7$ | $+1 \sim +3$ |

As is apparent from the above table, the specimens made by the metal mold according to the present invention had inclinations and the dispersion thereof much smaller than those of the specimens made by the conventional metal mold, and thus it was determined that the metal mold according to the present invention was effective to prevent the deformation of the resin substrates.

As shown in FIG. 6, according to the above metal mold of the first example, a resin substrate 10 for an optical recording medium is made which comprises one surface (signal pattern surface 10a) on which a desired signal pattern 12 is transferred having an outer circumferential edge thereof formed at an inclined shape, wherein burrs 11 project from the outer circumferential edge of the signal pattern surface 10a and the extreme end of the burrs 11 is disposed inwardly of the outer circumferential edge of a light incident surface 10b. Then, an optical recording medium 14 is made by forming a desired thin film layer 13 including at least a recording layer or a reflecting layer on the above signal pattern 12.

Since the optical recording medium in FIG. 6 has the burrs 11 projecting from the outer circumferential edge of the signal pattern surface 10a, the extreme end of which is disposed inwardly of the outer circumferential edge of the light incident surface 10b, the burrs 11 are barely observed from the plane direction of the optical recording medium 14 as observed in the direction of the arrow, and thus the burrs 11 do not deteriorate the outside appearance of the optical recording medium 14. In particular, such an advantage is increased in a two sided recording-type optical recording medium composed of two optical recording mediums 14 bonded together with the thin film layers 13 thereof faced inwardly.

Further, since the burrs 11 do not project outwardly beyond the light incident surface 10b, the external dimensional accuracy beyond the optical recording medium 14 is greatly improved.

Example 2

Next, a second example of the metal mold according to the present invention will be described below with reference to FIGS. 7, 8, 9, and 22.

Figure 7:
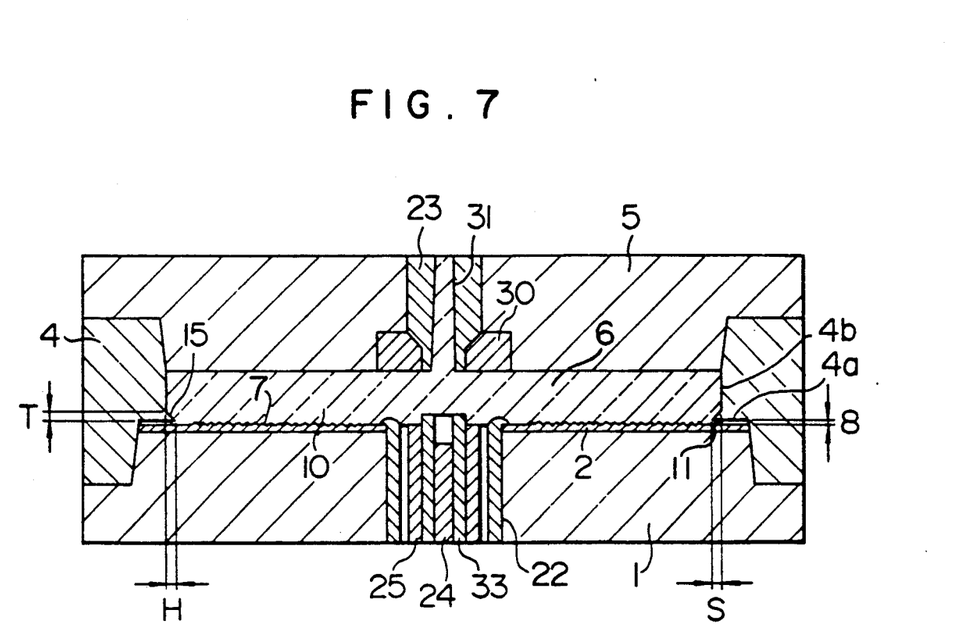
FIG. 7 is a cross sectional view of a metal mold according to the second example according to the present invention.

The metal mold of this example is such that the cavity side surface 4b of a stamper outer circumference presser 4 is formed substantially vertically or perpendicular with respect to a mirror plate 5 and the reverse pattern forming surface 10a of a stamper, and a projection 15 projecting into the cavity 6 is formed at a portion adjacent to the stamper abutting surface 4a of the cavity side surface 4b.

Although a projecting amount H of the above projection 15 can be arbitrarily designed, preferably it is larger than a projecting amount of S of burrs 11 made between the stamper 2 and the stamper outer circumference presser 4. Further, the above projection 15 preferably has a width T as small as possible and is formed to a shape as thin as possible, taking the strength thereof and the like into consideration.

Since the metal mold according to this example has the cavity side surface 4b of the stamper outer circumference presser 4 formed substantially vertical, a resin substrate having a more excellent outside appearance can be made. Further, since the projection 15 is formed to have a narrow width, the curvature of the resin substrate 10 can be reduced or eliminated as soon as the burrs 11 pass over the projection 15, and thus a resin substrate which is superior in optical characteristics can be made.

Figure 8:
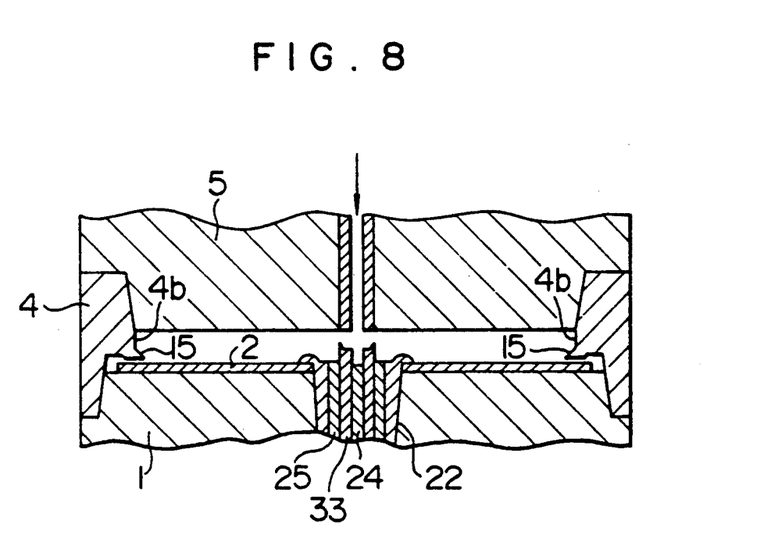
FIG. 8 is a cross sectional view of a metal mold for a transparent substrate according a modified embodiment of the example shown in FIG. 7.
Figure 22:
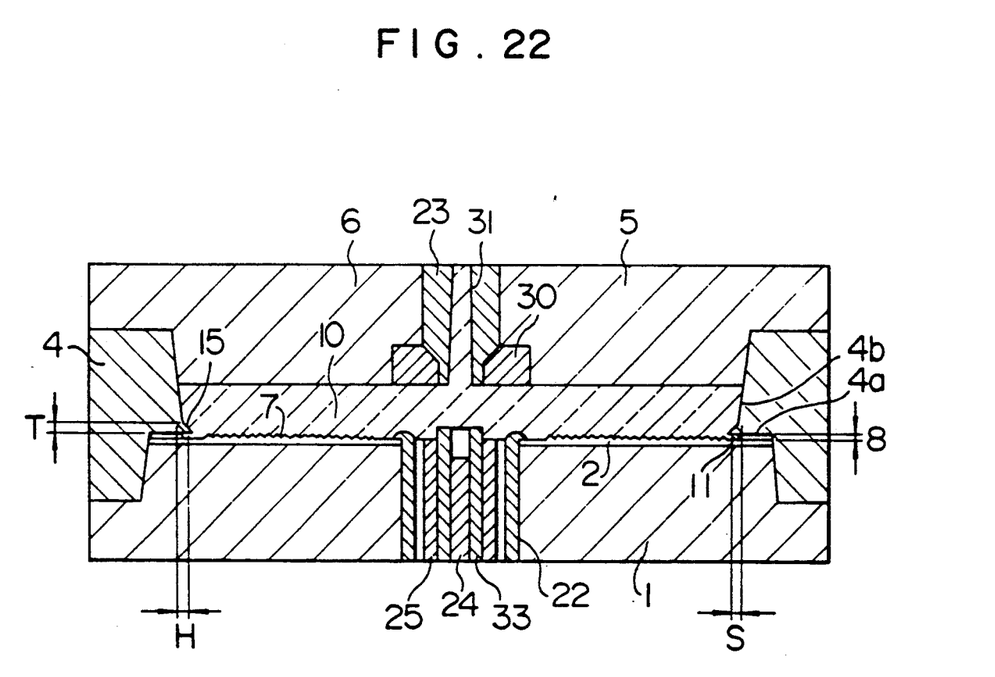
FIG. 22 is a cross sectional view of a metal mold of a modified example according to a second example of the present invention shown in FIG. 7.

FIG. 8 shows an example of the metal mold 4 with a projection 15 having a round configuration and FIG. 22 shows an example of a metal mold 4 the cavity side surface 4b of which is inclined.

Used as a material of the transparent substrate 10 are, for example, polycarbonate (PC), polymethyl methacrylate (PMMA), polymethyl pentene, epoxy, etc.

Figure 9:
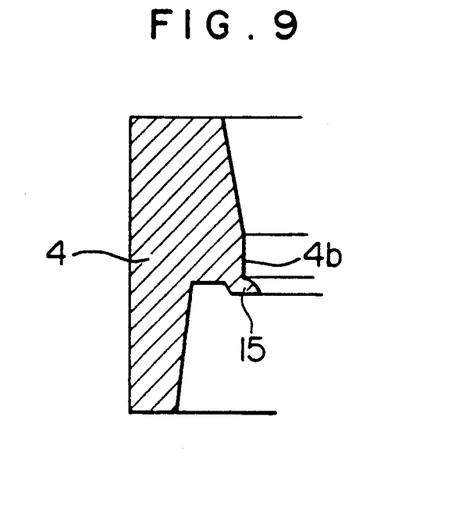
FIG. 9 is an enlarged cross sectional view of a stamper outer circumference pressing ring used for the metal mold.

As shown in FIGS. 8 and 9, the projection 15 projecting radially inwardly is disposed at the inner circumferential edge in contact with the stamper 2 at the outside diameter regulating surface 4b of the above stamper outer circumference presser 4. Therefore, as shown in FIG. 19, a ring-shaped cutout 40 in accordance with or corresponding to the configuration of the projection 15 is formed at the outer circumferential edge of the transparent substrate 10 molded by this metal mold.

Figure 19:
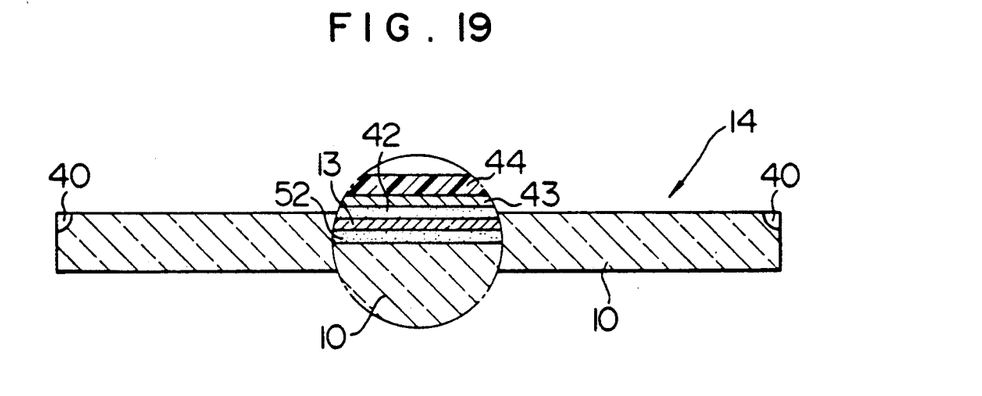
FIG. 19 is a cross sectional view of the magnetooptical type optical disc.

As shown in FIG. 19, a first enhanced film 52, a recording film 13, a second enhanced film 42, a metal reflecting film 43, and a protective film 44 are sequentially formed and laminated on the transparent substrate 10 performatted as described above by a predetermined film forming technique.

Used as the above first and second enhanced films 52 and 53, is, for example, a dielectric such as silicon nitride, aluminum nitride, etc.

Used as the recording film 13 composed of an optical-magnetic recording material is mainly an amorphous alloy such as, for example, Tb-Fe alloy, Tb-Fe-Co alloy, Tb-Fe-Co-Nb alloy, Tb-Fe-Nb alloy, Gd-Tb-Fe-Nb alloy, Gd-Tb-Fe-Co-Nb alloy, Gd-Tb-Fe alloy, Dy-Fe alloy, Mn-Cu-Bi alloy (crystalline substance), Gd-Tb-Fe-Ge alloy, Ge-Co alloy, Gd-Tb-Co alloy, Gd-Tb-Co-Nb alloy, a mixture of Tb-Fe alloy and Gd-Fe alloy, a mixture of Tb-Fe alloy and Gd-Fe-Co alloy, Tb-Dy-Fe-Co alloy, Tb-Ni-Fe alloy, Dy-Fe-Gd-Co alloy and so forth.

Used as a recording material of a write once type optical data recording medium is, for example, Te, Te-Se-Pb alloy, Te-C alloy, Te-TeO-TeO$_2$ alloy or an organic pigment having a recording ability.

Used as the above metal reflecting film 43 is, for example, Al, Al-Ni alloy, Al-Ti alloy, Al-Cr alloy, Al-Mn alloy, Al-Ni-Ti alloy, and so forth.

Used as the above protective film 44 is, for example, an organic material such as UV curing resin, epoxy resin, or, an inorganic material such as aluminum oxide, silicon oxide, and so forth.

Figure 21:
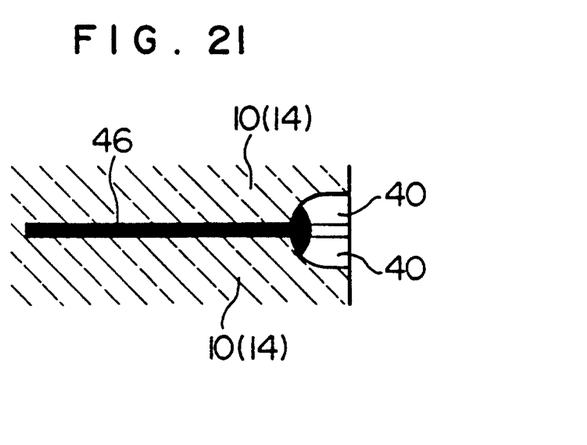
FIG. 21 is an enlarged cross sectional view of the bonded portion of the optical discs.

The thus arranged two optical discs 14 are integrally bonded together with the recording films 13 thereof faced inwardly by an adhesive 46, such as a UV curing resin, epoxy resin, etc. At the time, as shown in FIG. 21, the cutout 40 formed on the transparent substrate 10 serves as an adhesive stopper and thus the excessive adhesive 46 does not overflow to the outer circumference of the transparent substrate 10.

Figure 18:
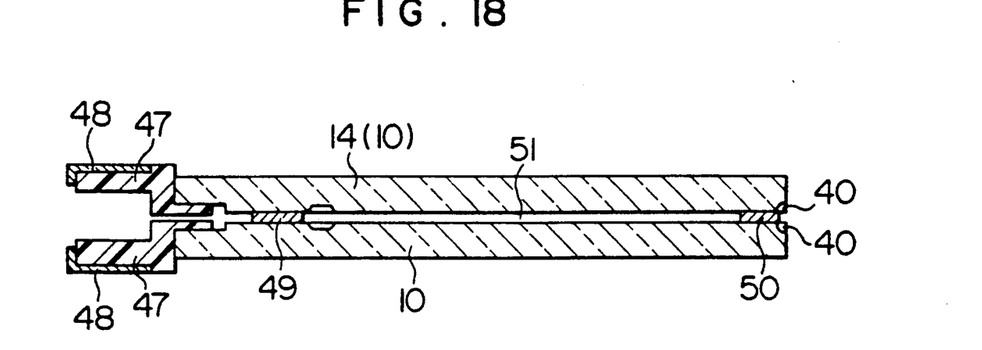
FIG. 18 is a cross sectional view of a write once type optical disc according to another example of the present invention.
Figure 20:
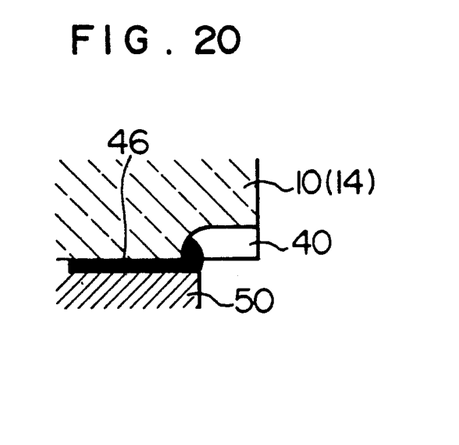
FIG. 20 is an enlarged cross sectional view of the optical disc.

FIGS. 18 and 20 are diagrams explaining another example of the present invention.

In FIGS. 18 and 20, there is seen a center hub 47, a magnetic plate 48 fixed to the center hub 47, an inner circumference spacer 49, an outer circumference spacer 50, and a void 51 formed by the above spacers 49 and 50.

In the case of this example, two preformatted optical discs 14 are integrally bonded together with the recording films thereof faced inwardly through the inner and outer circumference spacers 49 and 50. At the time, as shown in FIG. 10, a cutout 40 formed on a transparent substrate 10 serves as any adhesive stopper and thus an excessive adhesive 46 will not overflow to the outer circumference of the transparent substrate 10.

The gist of the present invention is to make a resin substrate for an optical recording medium in which an external dimension of a signal pattern surface is smaller than that of a light incident surface and the extreme ends of burrs projecting from the outer circumferential edge of the signal pattern surface are disposed inwardly of the outer circumferential edge of the light incident surface, and thus a dimension and inclination of each portion of a cavity can be of course suitably designed within a range not departing from the above gist. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A metal mold for fabricating a resin substrate for an optical recording medium having a light incident surface and a signal pattern surface comprising:

a stamper on which a reverse pattern of a signal pattern which is to be transferred onto said resin substrate is formed, a backing plate for reinforcing said stamper, a stamper inner circumference presser for fixing an inner circumference of said stamper to said backing plate, a stamper outer circumference presser having a first free end and a second stepped clamping end for loosely restricting an outer circumference of said stamper; and a mirror plate having an outer peripheral stepped portion for engaging said first free end of said stamper outer circumference presser, said second stepped clamping end of said outer circumference presser having a medial portion for providing a clearance between said stamper and said outer circumference presser and a lateral portion which engages a stepped portion of said backing plate, said medial portion having a side surface a portion of which engages said outer peripheral stepped portion of said mirror plate and a portion of which forms a cavity side surface, whereby as a result of constructing said metal mold a cavity is defined between said mirror plate, said stamper and said cavity side surface of said medial portion of said outer circumference presser, said cavity side surface of said medial portion of said outer circumference presser having a circumferential lower edge which extends into said cavity, a distance between said side surface portion juxtapositioned said outer peripheral stepped portion of said mirror plate being greater than a distance between said side surface portion which forms said cavity side surface, said clearance between said stamper and said outer circumference presser having a dimension such that upon fabrication of said resin substrate a burr is permitted to form around a circumference of said signal pattern surface of said substrate in conformity with said clearance, an external dimension of said burr extending radially from said signal pattern surface of said resin substrate being smaller than an external dimension of said light incident surface so that said burr never projects outside a circumference of said light incident surface of said substrate.

2. The metal mold according to claim 1, wherein said cavity side surface of said medial portion of said outer circumference presser is formed at an incline such that said outer circumference presser is narrower where said clearance is provided juxtapositioned to said stamper and made gradually wider in the direction of said mirror plate, such that a distance defined between opposite points on said circumferential lower edge of said outer circumference presser projecting into said cavity is smaller than a distance between corresponding points where said portion of said side surface of said outer circumference presser engages said outer peripheral stepped portion of said mirror plate over its entire surface.

3. The metal mold according to claim 1, wherein said cavity side surface of said medial portion of said outer circumference presser is formed substantially perpendicular to said mirror plate and said stamper, but for said lower edge of said medial portion which has formed thereon a projection which protrudes into said cavity.

4. The metal mold according to claim 3, wherein said projection is greater in size than a size of said burr formed on said substrate.

5. The metal molding according to claim 3, wherein said projection has a round configuration.

6. The metal mold according to claim 1, wherein said cavity side surface of said medial portion of said outer circumference presser is inclined terminating at its lower edge in a projection which protrudes into said cavity.

7. The metal mold according to claim 6, wherein said inclined cavity side surface of said medial portion of said outer circumference presser is contiguous with an inclined side surface of said medial portion of said outer circumference presser which engages said outer peripheral stepped portion of said mirror plate.

* * * * *